United States Patent
Hu et al.

(10) Patent No.: US 8,708,298 B2
(45) Date of Patent: Apr. 29, 2014

(54) SUPPORTING APPARATUS

(75) Inventors: Chung Cheng Hu, New Taipei (TW);
Der-Wei Lu, New Taipei (TW);
Chyi-Pyn Peng, New Taipei (TW);
Keng-Jui Chang, New Taipei (TW)

(73) Assignee: Syncmold Enterprise Corp., New Taipei (TW)

( * ) Notice: Subject to any disclaimer, the term of this patent is extended or adjusted under 35 U.S.C. 154(b) by 198 days.

(21) Appl. No.: 13/304,656

(22) Filed: Nov. 27, 2011

(65) Prior Publication Data

US 2013/0026314 A1      Jan. 31, 2013

(30) Foreign Application Priority Data

Jul. 27, 2011 (TW) .............................. 100213826 U

(51) Int. Cl.
*A47F 5/00* (2006.01)
(52) U.S. Cl.
USPC ............................ 248/371; 248/923; 248/446
(58) Field of Classification Search
USPC .............. 248/371, 372.1, 398, 446, 449, 451, 248/454, 455, 917, 919, 920, 921, 922, 248/923; D14/447
See application file for complete search history.

(56) References Cited

U.S. PATENT DOCUMENTS

| | | | | |
|---|---|---|---|---|
| 4,901,969 A * | 2/1990 | Yaeger | ........................ | 248/455 |
| 5,607,135 A * | 3/1997 | Yamada | ....................... | 248/456 |
| 6,557,811 B1 * | 5/2003 | Burns | ........................ | 248/460 |
| 7,403,613 B2 * | 7/2008 | Liou | ............................ | 379/455 |
| D626,964 S * | 11/2010 | Richardson et al. | ........ | D14/447 |
| 7,861,995 B2 * | 1/2011 | Liou | ............................ | 248/454 |
| 8,087,629 B2 * | 1/2012 | Gotovac | .................... | 248/299.1 |
| 8,100,376 B2 * | 1/2012 | Ye | ................................. | 248/454 |

* cited by examiner

*Primary Examiner* — Steven Marsh
(74) *Attorney, Agent, or Firm* — Li & Cai Intellectual Property (USA) Office

(57) ABSTRACT

The instant disclosure relates to a supporting apparatus for adapting to a flat electronic device. The supporting apparatus includes a pedestal and a carrying seat movably disposed thereon. The carrying seat includes a main body, a blocking member, and a bearing member. A sliding surface is formed on the main body. The blocking member is disposed on the main body, and a blocking surface is formed on the blocking member facing the sliding surface. The sliding surface and the blocking surface are arranged in gradual convergence. The bearing member is slidably disposed on the sliding surface and is separated from the blocking member. The bearing member is movable along the sliding surface in adjusting the distance between the bearing member and the blocking member. The flat electronic device is clipped fixingly by the bearing member and the blocking member on opposite sides thereof.

19 Claims, 10 Drawing Sheets

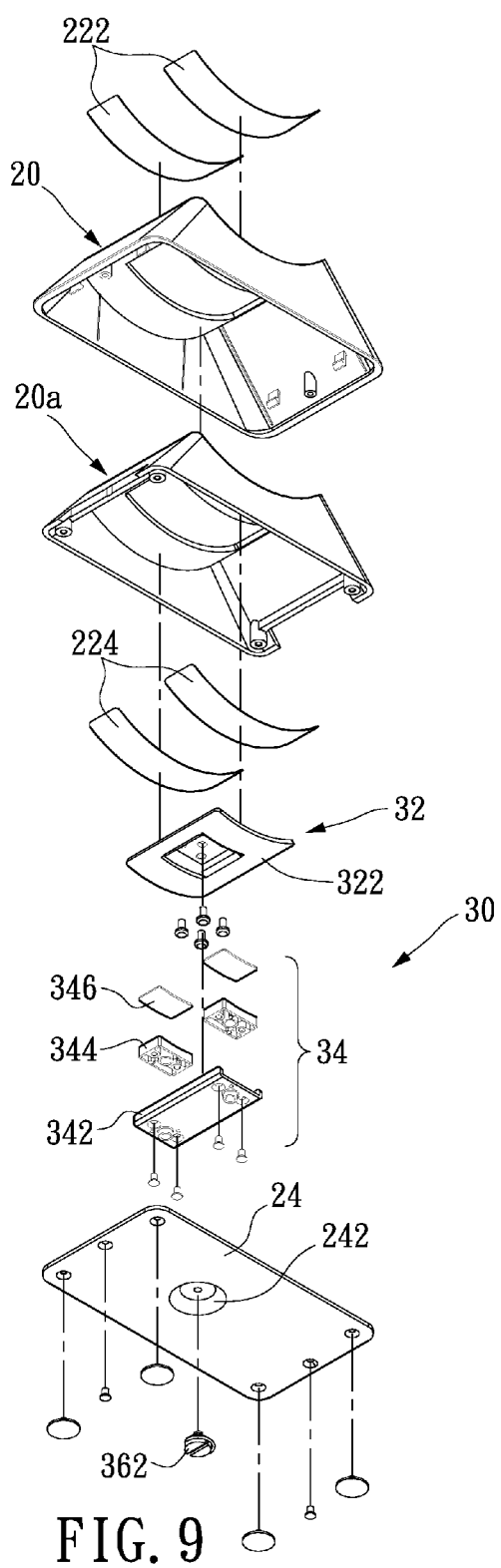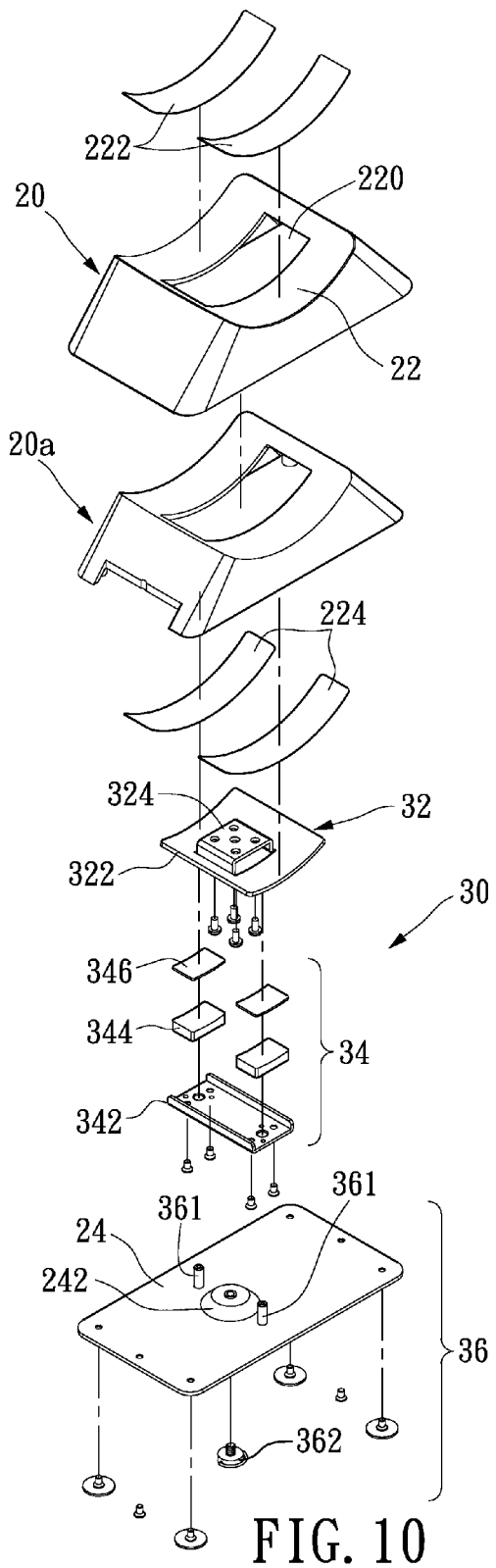

SUPPORTING APPARATUS

BACKGROUND OF THE INVENTION

1 Field of the Invention

The instant disclosure is related to a supporting apparatus. In particular, the instant disclosure relates to a supporting apparatus for accommodating flat electronic devices, for example, tablet computers, digital photo frames, mobile phones, etc.

2 Description of Related Art

With the advancement in touch-control technology, more and more tablet computers are produced. The screens of these tablet computers may be touched by the users for interfacing with ease. The tablet computer is usually held in one hand by the user at a desired angle, while the other hand operates the touch screen.

To place the tablet computer on a table or other level surface, so the user does not need to hold the device manually, a variety of supporting apparatus for tablet computers are developed. The existing supporting apparatus are designed to accommodate tablet computers of different sizes. For example, one of the designs utilizes a movable plate member and a fixed plate member to firmly clamp the tablet computer therebetween. The relative position between the movable plate member and the fixed plate member is adjusted through the turning of an adjustment screw. This kind of design requires a user's continuous effort in turning the adjustment screw, which is slow and inconvenient. Besides, the clamping force is not easy to control, and the tablet computer may be damaged due to excessive clamping force.

To address the above issue, the inventor strives via industrial experience and academic research to present the instant disclosure, which can effectively improve the limitation described above.

SUMMARY OF THE INVENTION

The instant disclosure provides a supporting apparatus, which is adaptable to flat electronic devices of different thicknesses. When the flat electronic device is disposed on the supporting apparatus of the instant disclosure, the supporting apparatus can automatically and quickly clip to the electronic device tightly, without any manual operation.

The instant disclosure further provides a supporting apparatus, which can tilt the flat electronic device at different viewing angles and perform slight adjustment of the tilting angle.

In order to achieve the above objectives, the supporting apparatus of the instant disclosure for supporting a flat electronic device comprises a carrying seat. The carrying seat includes a main body, a blocking member, and a bearing member. The main body is formed with a sliding surface. The blocking member is disposed on the main body, and a blocking surface is formed on the blocking member facing the sliding surface. The sliding surface and the blocking surface are arranged in gradual convergence toward the joining section between the blocking surface and the main body. The bearing member is used to support the flat electronic device. The bearing member is separated from the blocking member and is slidably disposed on the sliding surface. The bearing member may slide upward or downward relative to the sliding surface. The sliding motion of the bearing member changes its clearance to the blocking member, such that the flat electronic device may be held fixingly by the bearing member and the blocking member on opposite side portions thereof.

In order to achieve the above objectives, the supporting apparatus of the instant disclosure further comprises a pedestal and a retaining mechanism disposed therewithin. The pedestal has an arch-shaped top wall. The carrying seat is slidably disposed on the top wall of the pedestal. The retaining mechanism controls the carrying seat to be at a fixed state or a movable state relative to the pedestal.

The supporting apparatus of the instant disclosure has at least following advantages. The supporting apparatus is adaptable to flat electronic devices with different thicknesses. When the electronic device is disposed on the supporting apparatus, the supporting apparatus can automatically clip on the electronic device tightly. Besides, the supporting apparatus can be tilted at different angles, to provide different viewing angles to the held electronic device, and perform slight adjustment of the tilting angle.

For further understanding of the instant disclosure, reference is made to the following detailed description illustrating the embodiments and examples of the instant disclosure. The description is for illustrative purpose only and is not intended to limit the scope of the claim.

BRIEF DESCRIPTION OF THE DRAWINGS

FIG. 9 is an exploded view of the pedestal of the supporting apparatus of the instant disclosure;

FIG. 10 is an exploded view of the pedestal of the supporting apparatus of the instant disclosure taken from another angle.

DETAILED DESCRIPTION OF THE EMBODIMENT

To further understand the objectives, structures, and technical features of the instant disclosure, please refer to the detailed descriptions provided hereinbelow.

Figure 1:
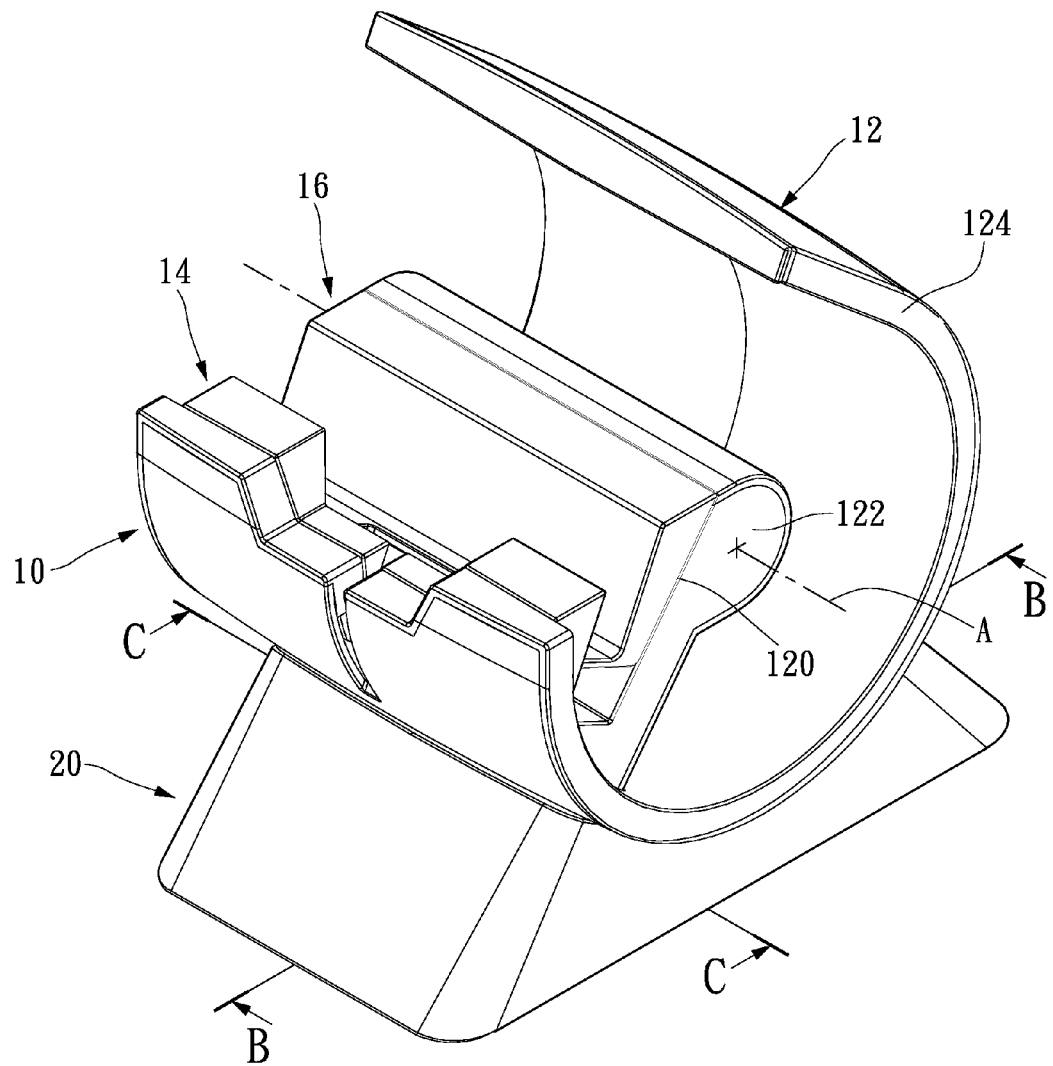
FIG. 1 is an assembled view of a supporting apparatus of the instant disclosure.
Figure 2:
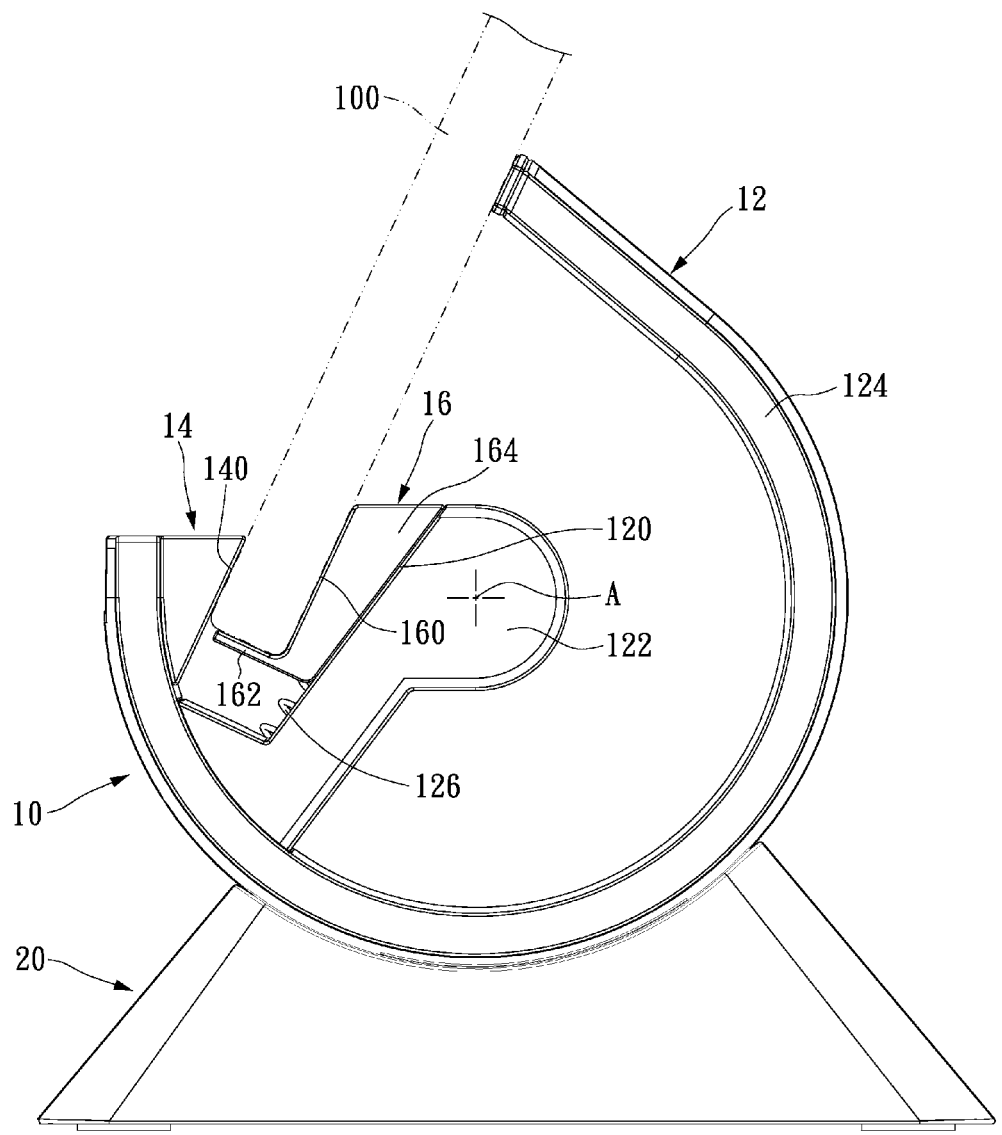
FIG. 2 is a side view of the supporting apparatus in FIG. 1.

Reference is made to FIGS. 1 and 2, which show a perspective view and a side view of a supporting apparatus of the instant disclosure, respectively. The supporting apparatus is adapted for supporting a flat electronic device 100, such as a tablet computer, a personal digital assistant (PDA), or a liquid crystal display (LCD). The supporting apparatus includes a carrying seat 10 and a pedestal 20. The carrying seat 10 is rotatably disposed on the pedestal 20 about a rotating axis A to tilt the electronic device 100 at different angles. The rotating axis A substantially passes through the geometric center of the carrying seat 10 longitudinally.

The carrying seat 10 includes a main body 12, a blocking member 14 and a bearing member 16. The blocking member 14 and the bearing member 16 are disposed on the main body 12. Whereas a receiving gap is defined between the blocking member 14 and the bearing member 16 for receiving the flat electronic device 100 (referred hereinafter as electronic device). One of the characteristics of the instant disclosure features when the electronic device 100 is disposed on the carrying seat 10, namely in between the blocking member 14 and the bearing member 16, the bearing member 16 would be pushed and slide downwardly. The displacement of the bearing member 16 reduces the width of the aforementioned receiving gap, or the "variable width", between the bearing member 16 and the blocking member 14. Thereby, the flat electronic device 100 may be clipped fixingly by the bearing member 16 and the blocking member 14 of the carrying seat 10. For flat electronic devices 100 with different thicknesses, the "variable width" may self-adjust accordingly to clip different flat electronic devices 100.

The design concept of the "variable width" is further explained hereinbelow. Namely, a sliding surface 120 is formed on the main body 12. The blocking member 14 is fixed on the main body 12, and a blocking surface 140 is formed on the blocking member 14 facing the sliding surface 120. The sliding surface 120 and the blocking surface 140 are arranged in gradual convergence toward the joining section between the blocking surface 140 and the main body 12. Namely, the sliding surface 120 and the blocking surface 140 approach one another along the downward direction in forming an upward-facing acute angle. The opening defined by the acute angle allows the flat electronic device 100 to be received therein. In other words, the sliding surface 120 and the blocking surface 140 are not parallel to one another, but rather extending divergently in the upward direction. The bearing member 16 is slidably mounted on the sliding surface 120 and is spaced from the blocking member 14. Thus, when the flat electronic device 100 is disposed on the bearing member 16, the bearing member 16 is pushed and slides downward along the sliding surface 120. While sliding downward, the bearing member 16 also approaches the blocking member 14, so the distance between the bearing member 16 and the blocking member 14 becomes smaller for the carrying seat 10 to clip on the flat electronic device 100.

For the instant embodiment, the main body 12 has a backrest portion 122 and a shell portion 124 spaced away therefrom. The sliding surface 120 is formed on the backrest portion 122. The shell portion 124, in particular, has a C-shaped cross-section along the longitudinal direction. The rotating axis A is substantially parallel and passes through the geometric center of the longitudinal cross section of the shell portion 124. The blocking member 14 is fixed at one end of the shell portion 124. Whereas the other end of the shell portion 124 extends upwardly for resting the back portion of the flat electronic device 100 thereon. In side view, the main body 12 is shaped as a left mirror image of the letter "G" in FIG. 4. Such configuration can reduce the overall weight of the carrying seat 10 and is easy for the user to dispose or remove the electronic device 100. However, the main body 12 of the instant disclosure is not limited to the shape disclosed herein, for example, it could be a half cylinder without any upward extension.

Figure 3:
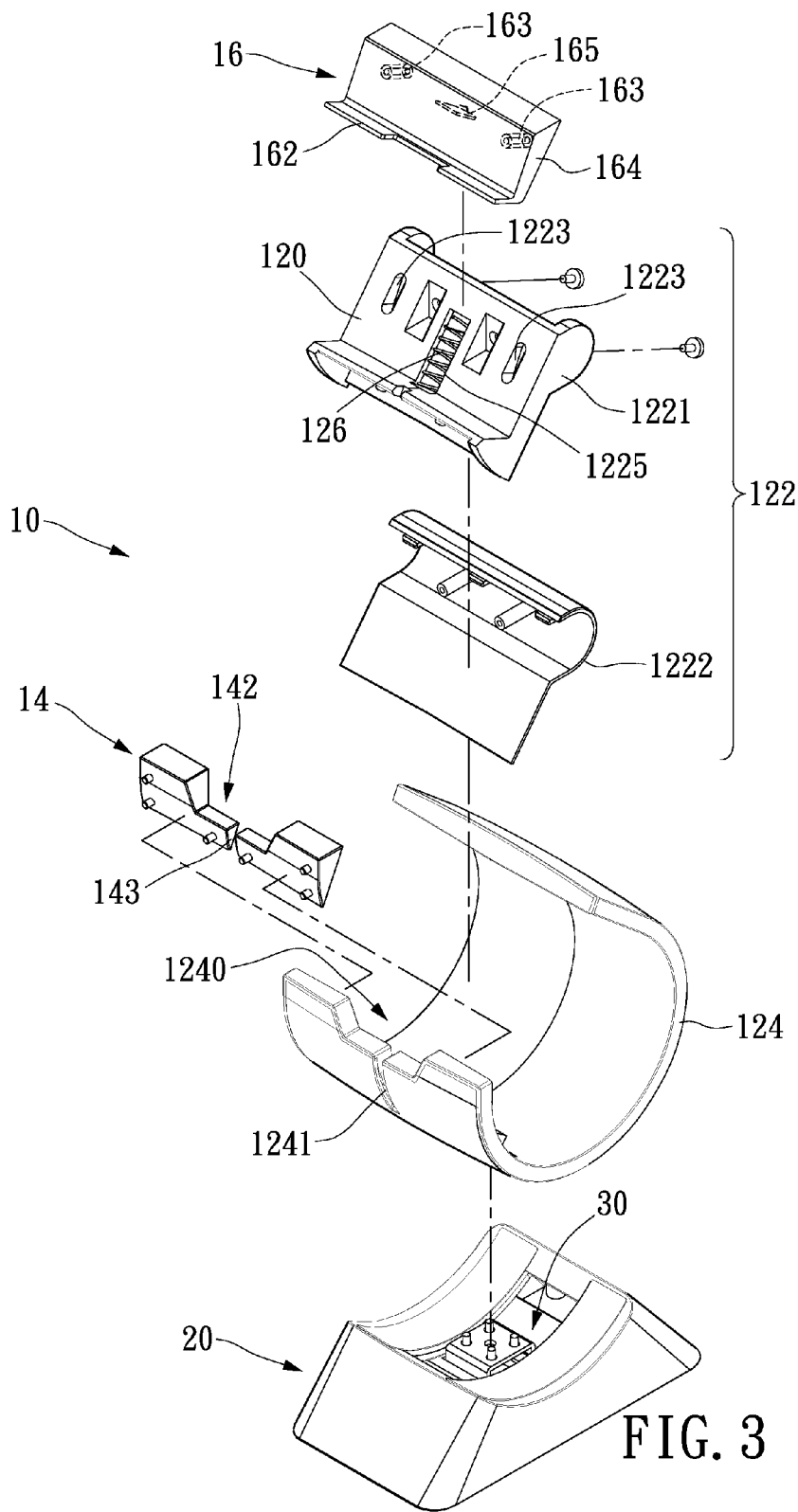
FIG. 3 is an exploded view of the supporting apparatus in FIG. 1.

Please refer to FIGS. 2 and 3, where FIG. 3 shows a detailed structural view of the carrying seat 10. The bearing member 16 has a lip portion 162 and a resting portion 164 extending upwardly therefrom. The lip portion 162 extends toward the blocking member 14 to support the electronic device 100. The resting portion 164 of the bearing member 16 has a bearing surface 160 facing the blocking member 14. The bearing surface 160 is substantially parallel to the blocking surface 140. The blocking surface 140 and the bearing surface 160 are not restricted to flat surfaces only, but may also be coated with soft-grade particles or having anti-slip pattern formed thereon.

Please refer back to FIG. 3, where the sliding mechanism of the bearing member 16 is introduced hereinbelow. The backrest portion 122 includes a front cover 1221 and a rear cover 1222. The front cover 1221 and the rear cover 1222 can be interconnected by screws. The bearing member 16 has a pair of guide rods 163 extending toward the backrest portion 122. The front cover 1221 of the backrest portion 122 is correspondingly formed with a pair of parallel troughs 1223. The guide rods 163 are movably disposed in the respective troughs 1223. The troughs 1223 allow the guide rods 163 to slide against the backrest portion 122, such that the bearing member 16 can slide smoothly on the backrest portion 122 of the main body 12 in upward or downward direction. The number of the guide rods 163 and the troughs 1223 are not limited to two.

Moreover, the bearing member 16 can be restored to the original position after the electronic device 100 is removed. The main body 12 further includes an elastic element 126 to provide the restoring force for the bearing member 16. The elastic element 126 is disposed between the backrest portion 122 and the bearing member 16. When the electronic device 100 is not being held by the carrying seat 10, the elastic element 126 maintains a maximum distance between the bearing member 16 and the backrest portion 122. The elastic element 126 is preferably a compression spring. A receiving slot 1225 is formed concavely on the central portion of the front cover 1221 of the backrest portion 122 for receiving the elastic element 126. The resting portion 164 of the bearing member 16 has a pressing tab 165 extending toward the backrest portion 122. The pressing tab 165 extends into the receiving slot 1225 and presses against the top end portion of the elastic element 126. Whereas the bottom end portion of the elastic element 126 is abutted against the bottom portion of the front cover 1221 of the backrest portion 122. Thereby, the restoring force is provided for returning the bearing member 16 upwards to the home position.

As shown in FIG. 3, a U-shaped slot 142 is formed concavely on the top end portion of the blocking member 14 and another U-shaped slot 1240 is formed concavely on the shell portion 124, correspondingly. The U-shaped slots 142, 1240 allow the control buttons on the lower portion of the flat electronic device 100 (e.g., the Home-button of iPad, not shown) to be exposed for operation. Furthermore, a cable slot 143 is formed adjacently to the U-shaped slot 142 on the blocking member 14 and another cable slot 1241 is formed adjacently to the U-shaped slot 1240 on the shell portion 124 for accommodating a power cord. In this embodiment, the blocking member 14 is comprised of two symmetric pieces, and the U-shape slot 142 and the cable slot 143 are defined between the two pieces. However, the blocking member 14 can be formed integrally in one piece as well.

Figure 4:
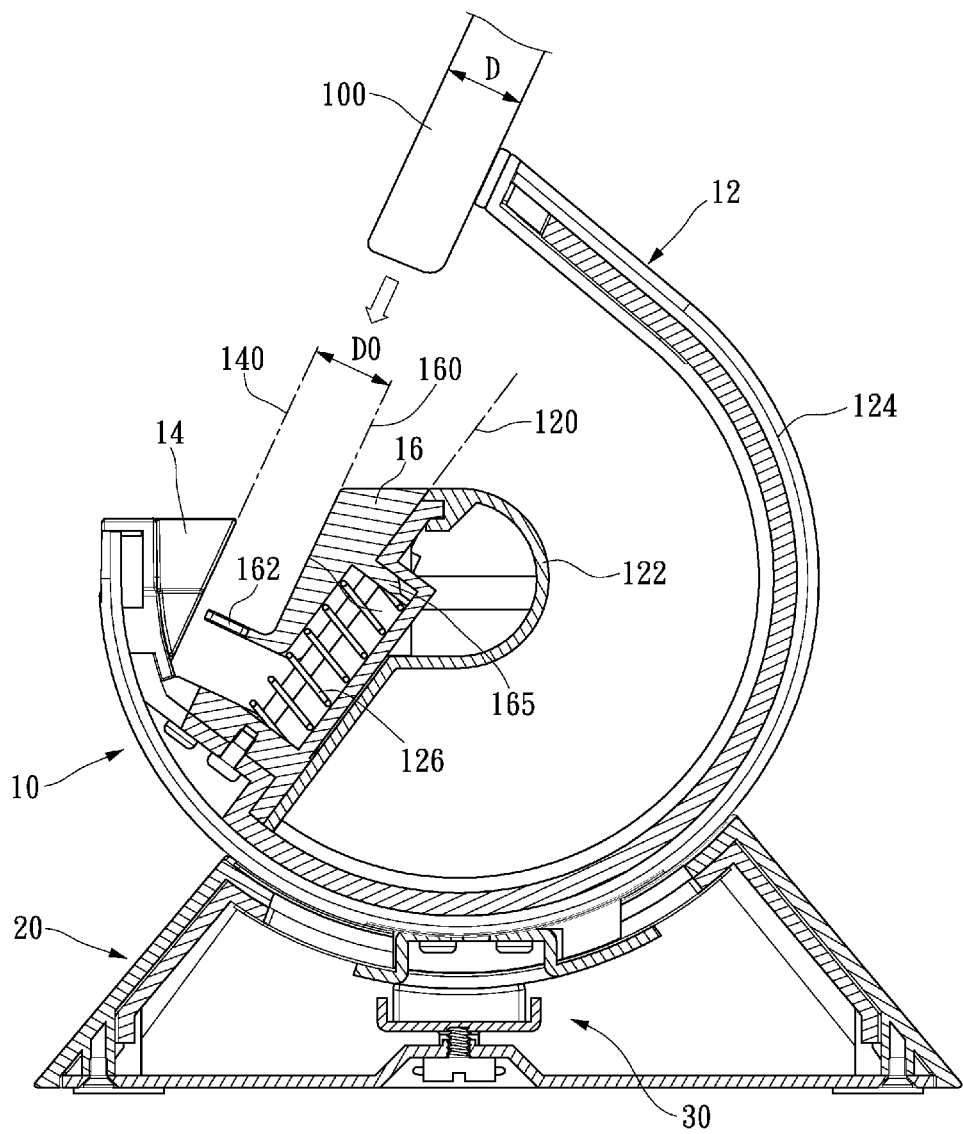
FIG. 4 is a cross-sectional view of the supporting apparatus in FIG. 1 taken along the line B-B without the electronic device.
Figure 5:
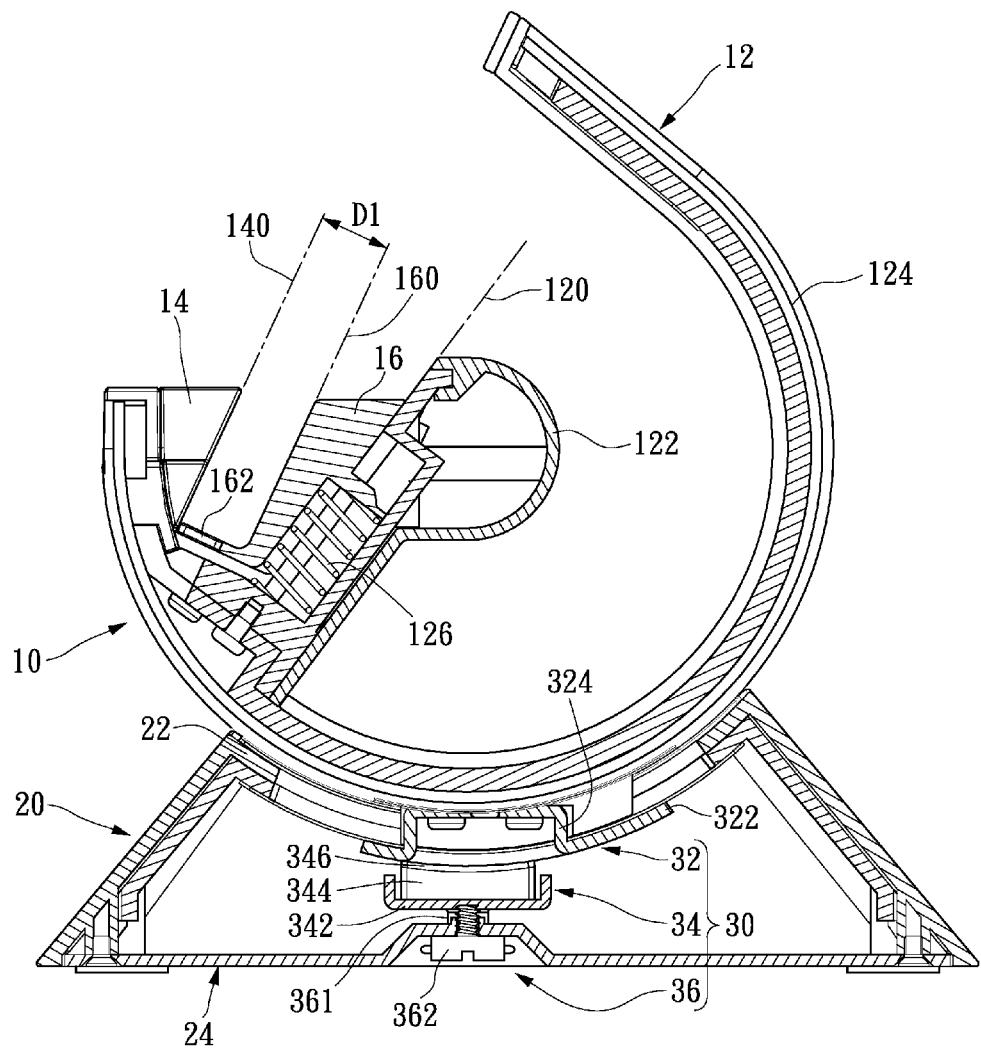
FIG. 5 is a cross-sectional view of the supporting apparatus in FIG. 1 taken along the line B-B if an electronic device is disposed on the supporting apparatus.
Figure 6:
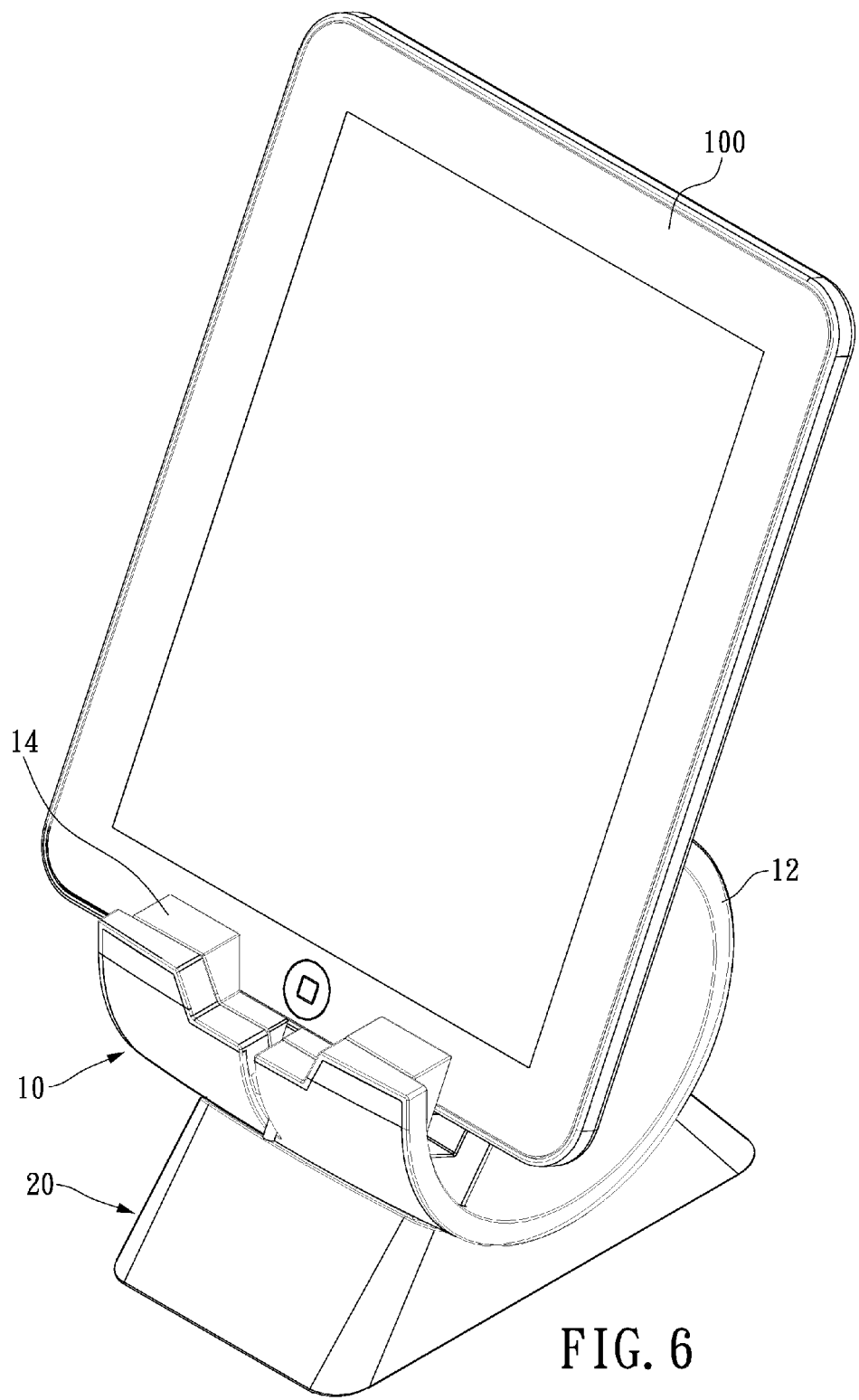
FIG. 6 is a perspective view of the supporting apparatus of the instant disclosure holding a tablet computer.

Please refer to FIGS. 4 and 5, which are different cross-sectional views of the supporting apparatus according to the instant disclosure. The clipping of the electronic device 100 is described in detail hereinbelow. For explanation purpose, the thickness of the electronic device 100 is denoted by D, and the distance between the blocking surface 140 of the blocking member 14 and the bearing surface 160 of the bearing member 16 is D0, when the electronic device 100 is yet being disposed on the carrying seat 10. After the electronic device 100 has been disposed in the carrying seat 10, the bearing member 16 moves downward along the sliding surface 120 of the main body 12 due to the weight of the electronic device 100. Since the sliding surface 120 and the blocking surface 140 form an upward acute angle, the distance between the bearing surface 160 and the blocking surface 140 becomes progressively smaller as the bearing member 16 slides downward and approaching the blocking member 14. The bearing member 16 continues to slide downward until the electronic device 100 is held fixingly between the blocking surface 140 and the sliding surface 160 on opposite side portions thereof, as shown in FIG. 6. The corresponding distance between the blocking surface 140 and the sliding surface 160 is herein denoted as D1, as indicated in FIG. 5, where D1 is less than D0 and substantially the same as the thickness of the electronic device 100. In other words, once the electronic device 100 is disposed on the carrying seat 10, the carrying seat 10 self-adjusts according to the corresponding thickness of the electronic device 100 for holding the electronic device 100 therein fixingly. Unlike the conventional design, the self-adjusting characteristic of the supporting apparatus of the instant disclosure requires no manual operation by the user. In practice, if the elastic element 126 is omitted, the user can still manually adjust the bearing member 16 to a proper position for clipping the electronic device 100.

Figure 7:
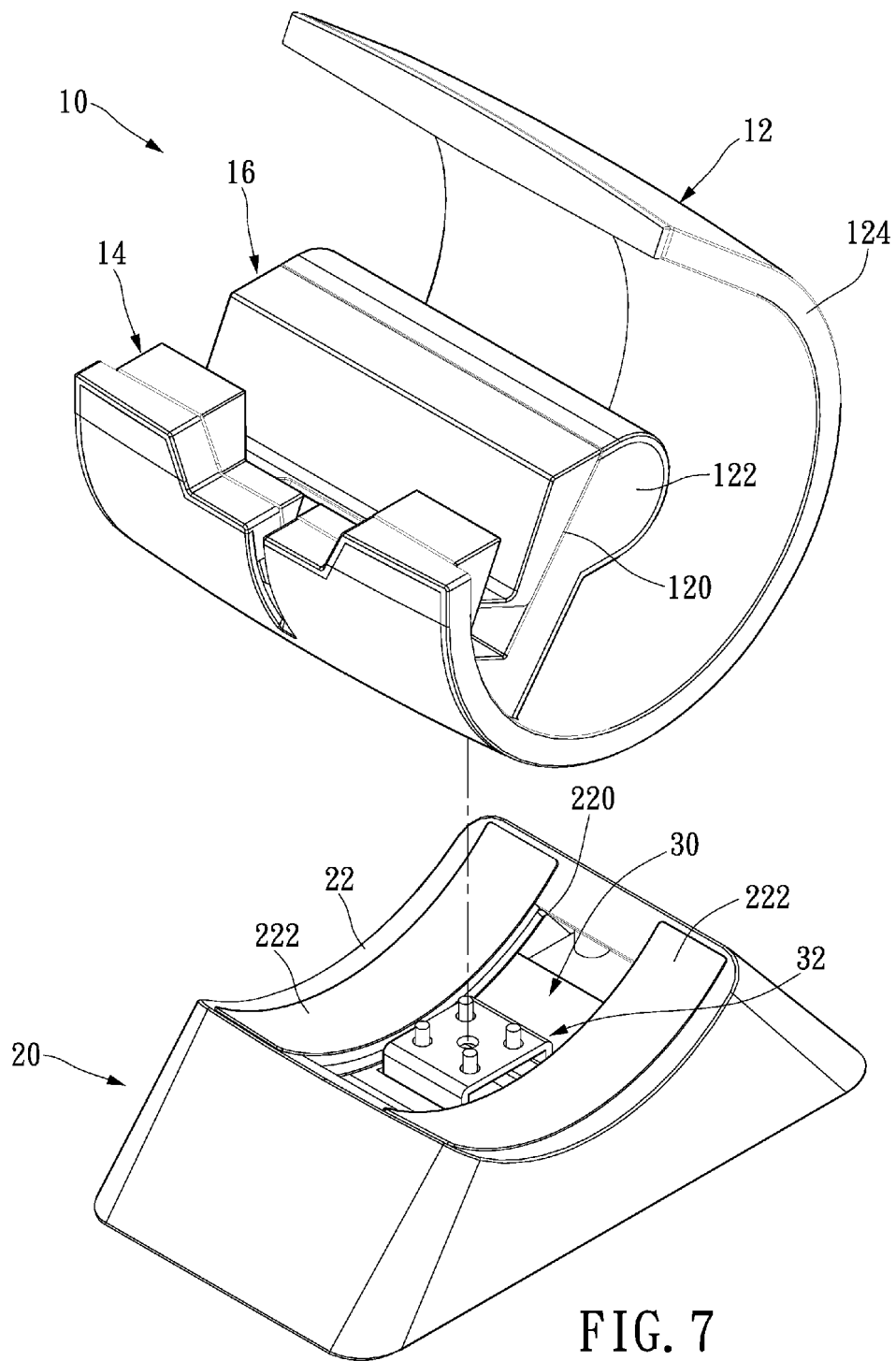
FIG. 7 is a perspective view of a carrying seat and a pedestal of the supporting apparatus of the instant disclosure.
Figure 8:
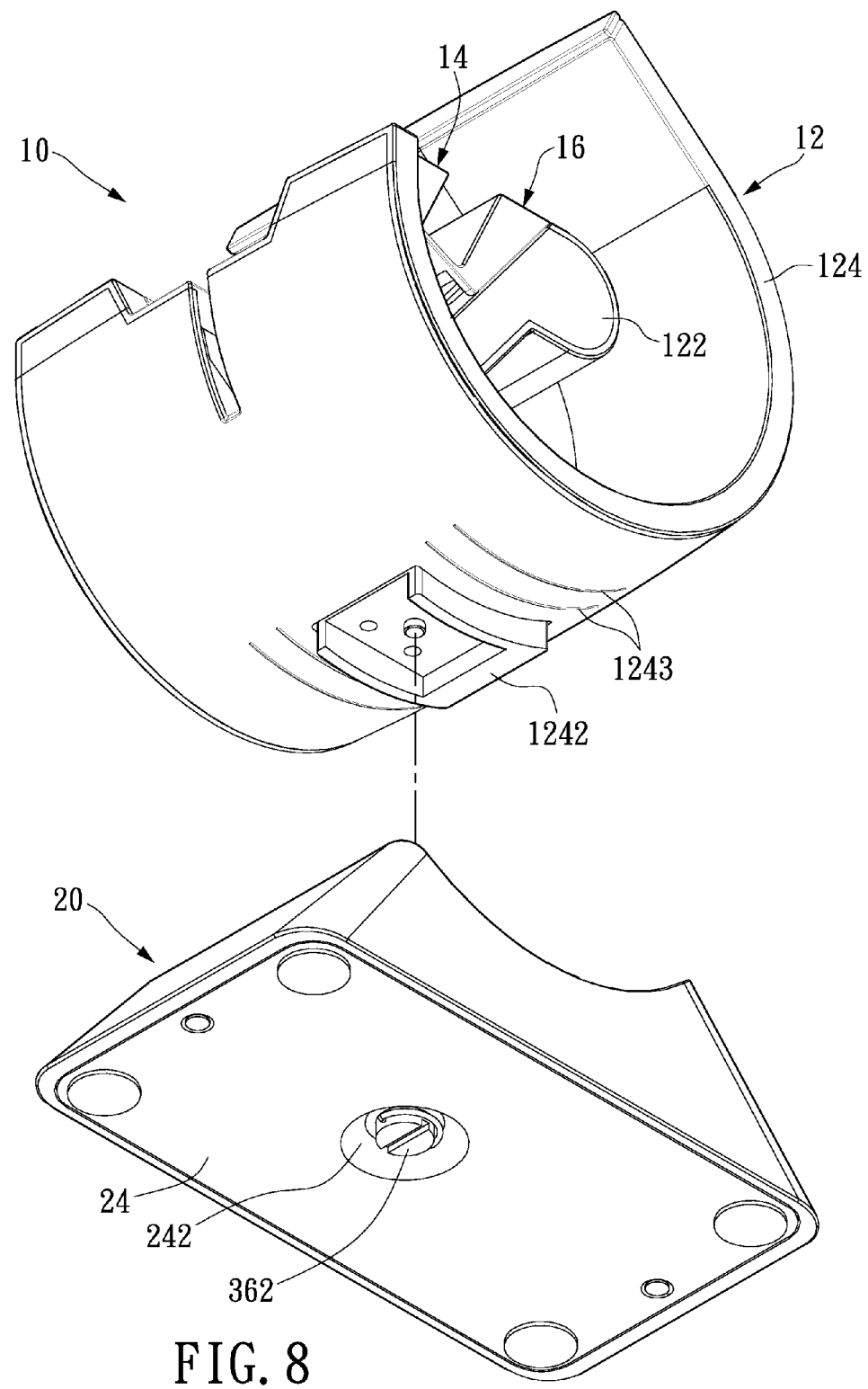
FIG. 8 is a perspective view of the carrying seat and the pedestal of the supporting apparatus of the instant disclosure taken from another angle.

Please refer to FIGS. 7 and 8. For the instant embodiment, the shell portion 124 of the carrying seat 10 has an arched bottom surface, and the pedestal 20 has a concaved top wall 22 formed correspondingly. The carrying seat 10 is rotatably disposed on the top wall 22 of the pedestal 20 about the rotating axis A. Since the top wall 22 is arranged matchingly to the arched bottom surface of the carrying seat 10, an arched surface having the same curvature as the shell portion 124 is formed concavely on the top wall 22. Thereby, when the carrying seat 10 is rotated against the pedestal 20, the shell portion 124 may rotate about the rotating axis A. In the meantime, the tilting angle of the electronic device 100 may be changed accordingly. As shown in FIG. 8, to reduce friction between the carrying seat 10 and the pedestal 20, the carrying seat 10 has a plurality of ribs 1243 protruded downwardly from the bottom surface thereof, where the ribs 1243 are abutted against the top wall 22. Besides, the carrying seat 10 has a mounting portion 1242 formed at the bottom surface thereof to connect with a retaining mechanism 30 inside the pedestal 20. Further details regarding the interconnection between the mounting portion 1242 and the retaining mechanism 30 are given hereinbelow.

Please refer to FIGS. 9 and 10, which are different exploded views of the pedestal 20. According to the instant embodiment, the retaining mechanism 30 is disposed inside the pedestal 20, for controlling the position of the carrying seat 10 relative to the pedestal 20 between a fixed state or a movable state. The retaining mechanism 30 includes a sledge 32, an elevating unit 36, and a braking unit 34. The sledge 32 passes through the top wall 22 and connects to the mounting portion 1242 of the carrying seat 10. The elevating unit 36 is disposed on the pedestal 20 and is partially exposed. The braking unit 34 is mounted on the elevating unit 36. The elevating unit 36 controls and adjusts the position of the braking unit 34 relative to the sledge 32. When the braking unit 34 is pressed against the sledge 32, the main body 12 becomes locked on the top wall 22 against any swinging movement. In other words, the carrying seat 10 is in a fixed state relative to the pedestal 20. When the braking unit 34 disengages from the sledge 32, the carrying seat 10 is transitioned to a movable state relative to the pedestal 20.

As shown in FIG. 10, an elongated guide slot 220 is formed on the top wall 22 of the pedestal 20. The sledge 32 includes a base member 322 and an adjoining member 324 protruding upwardly therefrom. The adjoining member 324 passes through the guide slot 220 and is fixed to the mounting portion 1242 on the bottom surface of the carrying seat 10 (as shown in FIG. 8). The base member 322 is adjacent to the bottom surface of the top wall 22. The pedestal 20 of the instant embodiment further includes a base plate 24 and an inner housing 20a fixed thereon, where the inner housing 20a encloses the retaining mechanism 30. The inner housing 20a is preferably made of metallic material to enhance its overall rigidity. The outer part of the pedestal 20 can be made of plastic for ease in applying surface treatment. The instant embodiment further includes a pair of adhesive-backed wear strips 222 disposed between the pedestal 20 and the carrying seat 10 and another pair of adhesive-backed wear strips 224 disposed between the pedestal 20 and the sledge 32. The wear strips 222, 224 are affixed to the pedestal 20.

Please refer back to FIGS. 9 and 10. The braking unit 34 includes a brake base 342 disposed inside the pedestal 20, two brake-pad holders 344 arranged on the brake base 342, and two brake pads 346 affixed to the brake-pad holders 344. The brake pads 346 are arranged adjacent to the base member 322 of the sledge 32, and the brake base 342 is abutted against the elevating unit 36. The number of brake-pad holders 344 and the brake pads 346 are not restricted. The brake-pad holders 344 are screwed to the brake base 342, and each brake-pad holder 244 has an arched top surface corresponding to the shape of the base member 322.

The elevating unit 36 includes a pair of guide posts 361 fixed to the top surface of the base plate 24 of the pedestal 20 and an adjusting screw 362 partially exposed from the pedestal 20. The brake base 342 is slidably disposed on the guide posts 361, and the adjusting screw 362 is abutted to the bottom face of the brake base 342. A receiving space 242 is formed concavely on the bottom surface of the base plate 24 of the pedestal 20. The head portion of the adjusting screw 362 is received in the receiving space 242. Whereas the body of the adjusting screw 362 passes through the base plate 24 in abutting against the brake base 342 the braking unit 34.

Figure 11:
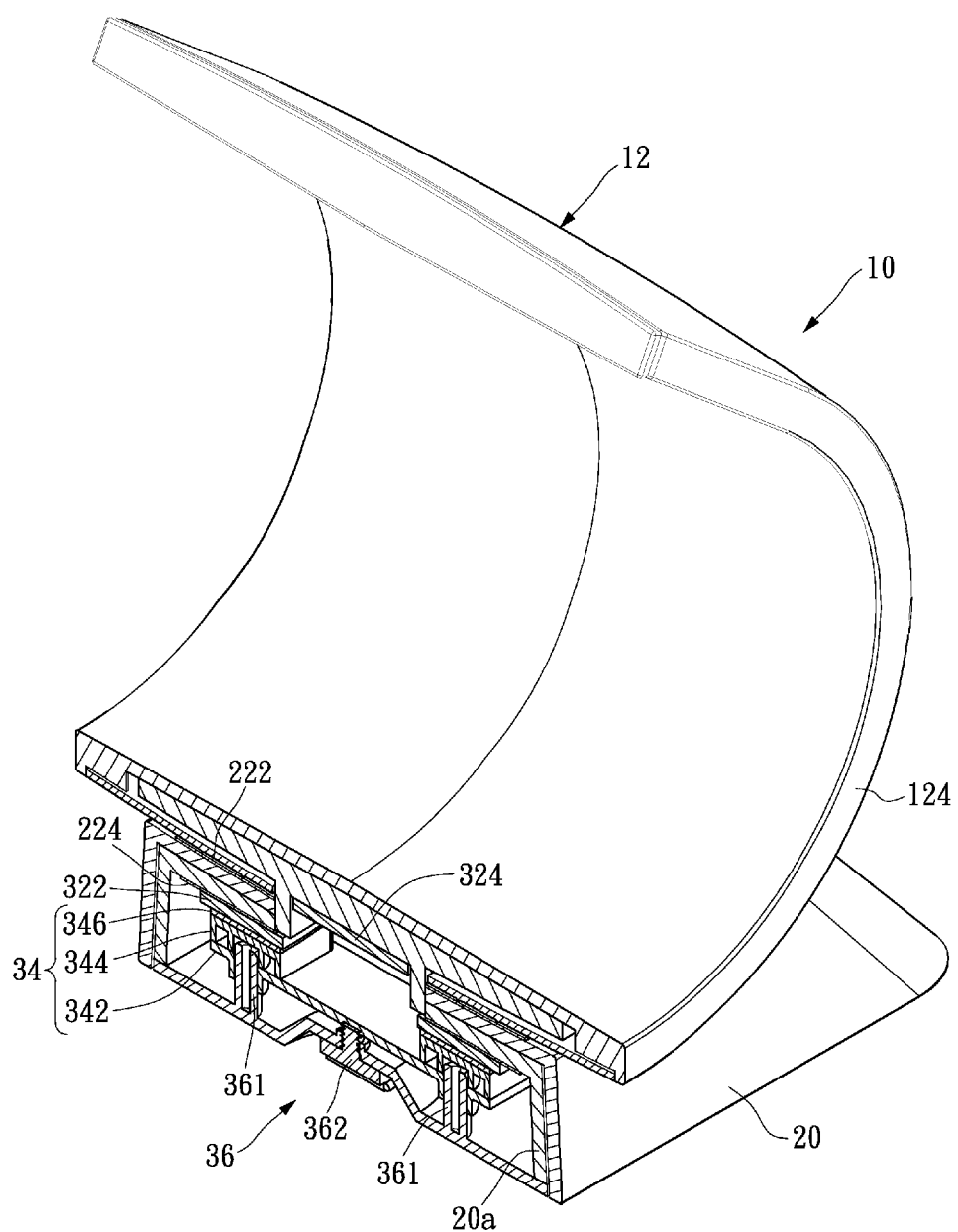
FIG. 11 is cross-sectional view of the supporting apparatus of the instant disclosure in FIG. 1 taken along the line C-C.

Please refer to FIG. 11 in conjunction with FIG. 5. For the instant embodiment, the adjusting screw 362 of the elevating unit 36 is exposed from the bottom surface of the pedestal 20. Thus, the user may turn the adjusting screw 362 in a direction away from the pedestal 20 to release the braking unit 34 from the sledge 32. Accordingly, the carrying seat 10 becomes free to rotate in a clockwise or counter-clockwise direction with respect to the rotating axis A on the pedestal 20 for tilting adjustment. Conversely, when the user turns the adjusting screw 362 toward the pedestal 20, the braking unit 34 is forced to press against the sledge 32. Accordingly, the carrying seat 10 is disabled from sliding against the pedestal 20 and becomes fixed. Thereby, the carrying seat 10 can be fixed at various tilting angles for viewing the flat electronic device 100.

The supporting apparatus of the instant disclosure has the following advantages. One attribute is when the flat electronic device 100 is disposed on the bearing member 16 of the carrying seat 10, the bearing member 16 is pushed to slide downward along the sliding surface 120 of the main body 12, so that the distance between the bearing member 16 and the blocking member 14 is reduced. The bearing member 16 also forces the electronic device 100 tightly against the blocking member 14. Therefore, the supporting apparatus of the instant disclosure can adapt to flat electronic devices of different thicknesses, and the electronic device 100 is clipped securely by the supporting apparatus in a self-clipping fashion.

In addition, the carrying seat 10 is slidably disposed on the pedestal 20, and the retaining mechanism 30 inside the pedestal 20 is used to unlock or lock the carrying seat 10. Once the carrying seat 10 is unlocked by the retaining mechanism 30, the carrying seat 10 may be adjusted to different tilting positions for viewing the electronic device 100. The supporting apparatus of the instant disclosure is capable of making slight tilting adjustment.

The descriptions above only illustrate specific embodiment and example of the instant disclosure. The instant disclosure should therefore cover various modifications and variations made to the herein-described structure and operations of the instant disclosure, provided they fall within the scope of the instant disclosure as defined in the following appended claims.

What is claimed is:

1. A supporting apparatus, for supporting a flat electronic device, comprising:
    a carrying seat including
        a main body having a sliding surface defined thereon;
        a blocking member disposed on the main body having a blocking surface defined thereon facing the sliding surface, wherein the sliding surface and the blocking surface are arranged in gradual convergence toward a joining section between the blocking surface and the main body; and
        a bearing member supporting the flat electronic device, wherein the bearing member is slidably disposed on the sliding surface and is separated from the blocking member;
    wherein the bearing member is movable along the sliding surface, and the distance between the bearing member and the blocking member is adjustable so that two sides of the flat electronic device are fixedly retainable by the bearing member and the blocking member;
    wherein the main body has a backrest portion, and the sliding surface is formed on the backrest portion, wherein the bearing member has at least one guide rod extending toward the backrest portion, and at least one trough is formed correspondingly on the backrest portion, and wherein the guide rod is movably disposed in the trough.

2. The supporting apparatus of claim 1, wherein the main body further includes an elastic element, and two ends of the elastic element respectively abut against the backrest portion and the bearing member, whereby a maximum distance is maintained between the bearing member and the backrest portion by the elastic element when the flat electronic device is not disposed on the carrying seat.

3. The supporting apparatus of claim 2, wherein the bearing member has a pressing tab extending toward the backrest portion, wherein a receiving slot is formed concavely on the backrest portion for receiving the elastic element, wherein two ends of the elastic element are respectively abutted against the backrest portion and the pressing tab.

4. The supporting apparatus of claim 1, wherein the bearing member has a lip portion and a resting portion extending therefrom, wherein the lip portion extends toward the blocking member, wherein the resting portion of the bearing member has a bearing surface facing the blocking member, the bearing surface is substantially parallel to the blocking surface.

5. The supporting apparatus of claim 1, further comprising a pedestal disposed underneath the carrying seat, wherein an arched top wall is formed concavely on the pedestal, wherein the bottom surface of the carrying seat is arch-shaped having the same curvature as that of the top wall of the pedestal, and wherein the carrying seat is rotatably disposed on the top wall of the pedestal about a rotating axis.

6. The supporting apparatus of claim 5, wherein the main body further includes a shell portion having a C-shaped cross-section, and the rotating axis passes longitudinally through a geometrical center of the shell portion, wherein the blocking member is disposed at one end of the shell portion, the shell portion has another end upwardly extended for resting the flat electronic device.

7. The supporting apparatus of claim 6, wherein a U-shaped slot is formed concavely on a top end portion of the blocking member and another U-shaped slot is formed concavely on the shell portion correspondingly, and wherein a cable slot is formed adjacently to each U-shaped slot.

8. The supporting apparatus of claim 5, further comprising a retaining mechanism disposed inside the pedestal, wherein the retaining mechanism includes a sledge passing through the top wall and connecting to the bottom surface of the carrying seat, an elevating unit disposed on the pedestal, and a braking unit mounted on the elevating unit, wherein the elevating unit adjusts the position of the braking unit relative to the sledge,
    whereby when the braking unit is pressing against the sledge, the carrying seat is fixed to the pedestal; when the braking unit is disengaged from the sledge, the carrying seat is enabled to move relative to the pedestal.

9. The supporting apparatus of claim 8, wherein a guide slot is formed on the top wall of the pedestal, wherein the sledge has a base member and an adjoining member protruding upwardly therefrom, wherein the adjoining member passes through the guide slot and is fixed to the bottom surface of the carrying seat, and wherein the base member is adjacent to the bottom surface of the top wall.

10. The supporting apparatus of claim 8, wherein the pedestal further includes at least one wear strip disposed between the pedestal and the carrying seat or between the pedestal and the sledge.

11. The supporting apparatus of claim 8, wherein the braking unit includes a brake base disposed inside the pedestal, at least one brake-pad holder disposed on the brake base, and at least one brake pad affixed to the brake-pad holder, wherein the brake pad is adjacent to the base member of the sledge, and wherein the brake base is abutted by the elevating unit.

12. The supporting apparatus of claim 11, wherein the elevating unit includes a pair of guide posts and an adjusting screw partially exposed from the pedestal, wherein the brake base is slidably disposed on the guide posts, and wherein the adjusting screw abuts against the bottom surface of the brake base.

13. The supporting apparatus of claim 12, wherein the pedestal has a base plate, wherein the adjusting screw passes through the base plate and is rotatable therethrough.

14. A supporting apparatus, for supporting a flat electronic device, comprising:
    a carrying seat including
        a main body having a sliding surface defined thereon;
        a blocking member disposed on the main body having a blocking surface defined thereon facing the sliding surface, wherein the sliding surface and the blocking surface are arranged in gradual convergence toward a joining section between the blocking surface and the main body; and
        a bearing member supporting the flat electronic device, wherein the bearing member is slidably disposed on the sliding surface and is separated from the blocking member;

wherein the bearing member is movable along the sliding surface, and the distance between the bearing member and the blocking member is adjustable so that two sides of the flat electronic device are fixedly retainable by the bearing member and the blocking member; and a pedestal disposed underneath the carrying seat, wherein an arched top wall is formed concavely on the pedestal, wherein the bottom surface of the carrying seat is arch-shaped having the same curvature as that of the top wall of the pedestal, and wherein the carrying seat is rotatably disposed on the top wall of the pedestal about a rotating axis.

15. The supporting apparatus of claim 14, wherein the main body further includes a shell portion having a C-shaped cross-section, and the rotating axis passes longitudinally through a geometrical center of the shell portion, wherein the blocking member is disposed at one end of the shell portion, the shell portion has another end upwardly extended for resting the flat electronic device.

16. The supporting apparatus of claim 15, wherein a U-shaped slot is formed concavely on a top end portion of the blocking member and another U-shaped slot is formed concavely on the shell portion correspondingly, and wherein a cable slot is formed adjacently to each U-shaped slot.

17. The supporting apparatus of claim 14, further comprising a retaining mechanism disposed inside the pedestal, wherein the retaining mechanism includes a sledge passing through the top wall and connecting to the bottom surface of the carrying seat, an elevating unit disposed on the pedestal, and a braking unit mounted on the elevating unit, wherein the elevating unit adjusts the position of the braking unit relative to the sledge, whereby when the braking unit is pressing against the sledge, the carrying seat is fixed to the pedestal; when the braking unit is disengaged from the sledge, the carrying seat is enabled to move relative to the pedestal.

18. The supporting apparatus of claim 17, wherein a guide slot is formed on the top wall of the pedestal, wherein the sledge has a base member and an adjoining member protruding upwardly therefrom, wherein the adjoining member passes through the guide slot and is fixed to the bottom surface of the carrying seat, and wherein the base member is adjacent to the bottom surface of the top wall.

19. The supporting apparatus of claim 17, wherein the pedestal further includes at least one wear strip disposed between the pedestal and the carrying seat or between the pedestal and the sledge.

* * * * *